UNITED STATES PATENT OFFICE.

CARL KREKELER AND PAUL KRAIS, OF ELBERFELD, GERMANY, ASSIGNORS TO THE FARBENFABRIKEN, VORMALS FR. BAYER & CO., OF SAME PLACE.

RED DYE.

SPECIFICATION forming part of Letters Patent No. 498,982, dated June 6, 1893.

Application filed January 21, 1893. Serial No. 459,050. (Specimens.)

*To all whom it may concern:*

Be it known that we, CARL KREKELER and PAUL KRAIS, chemists, (assignors to the FARBENFABRIKEN, VORMALS FR. BAYER & CO., of Elberfeld,) subjects of the Emperor of Germany, residing at Elberfeld, Germany, have invented a new and useful Improvement in the Manufacture of Dye-Stuffs, of which the following is a specification.

Our invention relates to the production of a new azo dye-stuff by combining equal molecular proportions of alphanaphthol alpha-monosulpho acid (1.5) or its alkaline salts and diazotized amidobenzoic acid.

In carrying out our invention practically we proceed as follows: 1.37 kilos, by weight, of amidobenzoic acid are dissolved in about one hundred liters of water with the addition of 2.44 kilos, by weight, of a muriatic acid solution (containing thirty per cent. of pure hydrochloric acid), and this solution, after cooling, is slowly mixed with a liquid prepared by dissolving 0.7 kilos, by weight, of sodium nitrite in about four liters of water, in order to produce the diazo compound of amidobenzoic acid. When the diazotizing is completed, the resulting liquid is cooled and added to an icy cold solution obtained by dissolving 2.46 kilos, by weight, of the sodium salt alpha-naphtholalphamonosulpho acid (1.5) and 2.12 kilos, by weight, of sodium carbonate ($Na_2CO_3$). After standing for about twelve hours the resulting liquid mixture is acidulated by the addition of hydrochloric acid in excess, and the dye-stuff is isolated by salting out, filtering off, washing with a solution of common salt in water, pressing and drying.

Our new dye-stuff thus produced and corresponding to the following formula:

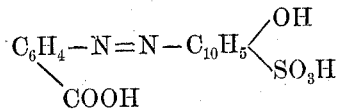

forms a dark red mass and, after pulverizing, a dark red powder. It easily dissolves in water with red color; out of its solutions in water it is again precipitated by an addition of common salt or concentrated hydrochloric acid. It is soluble in alcohol with red color showing a yellowish-hue. By ammonia, sodium carbonate and soda-lye it is dissolved with red color, while it is only sparingly soluble in diluted hydrochloric or sulfuric acid with slightly red color. On adding to its watery solutions ammonia, sodium carbonate or soda-lye the original red color becomes somewhat more yellowish. If hydrochloric or sulfuric acid is added to its solutions in water, red flakes are precipitated. In concentrated sulfuric acid it dissolves with bluish-red color which on the addition of water becomes yellower, a precipitate being not separated. It is capable of dyeing in acid baths wool mordanted with chromium salts, and especially it is adapted for printing purposes, as it yields red shades, when a paste containing this new product mixed with a chromium salt and a suitable thickening is printed on cotton goods.

Having thus described our invention and in what manner it can be performed, that which we claim as new, and desire to secure by Letters Patent, is—

1. The process of producing a new azo coloring-matter by combining equal molecular proportions of alphanaphtholalphamonosulpho acid ($OH:SO_3H=1.5$) or its alkaline salts and diazotized amidobenzoic acid.

2. The coloring-matter which has the formula:

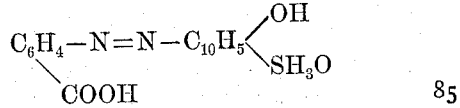

forming a dark red powder, soluble in water with red color, which changes on addition of ammonia, sodium carbonate or soda-lye to slightly yellower red, and from its aqueous solution the coloring matter is precipitated by the addition of common salt or concentrated hydrochloric acid; soluble in alcohol with red color, showing a yellowish hue; soluble in concentrated sulphuric acid with bluish-red color, turning yellower on addition of water; soluble in ammonia, sodium carbonate and soda-lye with red color; sparingly soluble in dilute hydrochloric and sulphuric acid with slightly red color; producing on chrome mordants red shades; and having the qualities substantially as specified.

In testimony whereof we have signed our names in the presence of two subscribing witnesses.

CARL KREKELER.
PAUL KRAIS.

Witnesses:
 WM. ESSENWEIN,
 RUDOLPH FRICKE.